US012512599B2

(12) United States Patent
Pan et al.

(10) Patent No.: US 12,512,599 B2
(45) Date of Patent: Dec. 30, 2025

(54) LEAKY-WAVE ANTENNA, ANTENNA ARRAY, AND ELECTRONIC DEVICE

(71) Applicant: BOE TECHNOLOGY GROUP CO., LTD., Beijing (CN)

(72) Inventors: Cheng Pan, Beijing (CN); Shiqiao Zhang, Beijing (CN); Jia Fang, Beijing (CN); Feng Qu, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 306 days.

(21) Appl. No.: 18/280,124

(22) PCT Filed: Nov. 25, 2022

(86) PCT No.: PCT/CN2022/134259

§ 371 (c)(1),
(2) Date: Sep. 1, 2023

(87) PCT Pub. No.: WO2024/108531

PCT Pub. Date: May 30, 2024

(65) Prior Publication Data

US 2025/0047005 A1 Feb. 6, 2025

(51) Int. Cl.
*H01Q 13/20* (2006.01)
*H01Q 1/38* (2006.01)

(52) U.S. Cl.
CPC ............... *H01Q 13/20* (2013.01); *H01Q 1/38* (2013.01)

(58) Field of Classification Search
CPC ............ H01Q 13/20; H01Q 1/38; H01Q 1/50; H01Q 13/00; H01Q 1/24; H01Q 1/36; H01Q 13/206
See application file for complete search history.

(56) References Cited

U.S. PATENT DOCUMENTS

2001/0017603 A1* 8/2001 Teshirogi ............... H01Q 13/28 343/785
2010/0308938 A1* 12/2010 Arregui Padilla ...... H01P 1/207 333/211

FOREIGN PATENT DOCUMENTS

CN 101771196 A 7/2010
CN 105071019 A 11/2015
CN 105826672 A 8/2016
CN 107464994 A 12/2017
CN 108390656 A 8/2018
(Continued)

*Primary Examiner* — David E Lotter
(74) *Attorney, Agent, or Firm* — HOUTTEMAN LAW LLC

(57) ABSTRACT

A leaky-wave antenna includes: first and second substrates opposite to each other; and an adjustable dielectric layer between the first and second substrates; the first substrate includes a first dielectric substrate, and first and second transmission lines on a side of the first dielectric substrate close to the adjustable dielectric layer; the first transmission line includes a first trunk line and at least one first main branch connected thereto, and a first auxiliary branch connected to the first main branch; the second transmission line includes a second trunk line and at least one second main branch connected thereto, and a second auxiliary branch connected to the second main branch; the first trunk line and the second trunk line are arranged side by side, with a first gap therebetween; the second substrate includes a second dielectric substrate and a reference electrode layer on the second dielectric substrate.

20 Claims, 7 Drawing Sheets

(56) References Cited

FOREIGN PATENT DOCUMENTS

| | | | |
|---|---|---|---|
| CN | 108718001 | A | 10/2018 |
| CN | 208654481 | U | 3/2019 |
| CN | 109860963 | A | 6/2019 |
| CN | 110197939 | A | 9/2019 |
| CN | 111769359 | A | 10/2020 |
| CN | 112448166 | A | 3/2021 |
| CN | 113097750 | A | 7/2021 |
| CN | 114039211 | A | 2/2022 |
| JP | 2001320229 | A | 11/2001 |
| JP | 2004350163 | A | 12/2004 |
| JP | 2008035424 | A | 2/2008 |

* cited by examiner

LEAKY-WAVE ANTENNA, ANTENNA ARRAY, AND ELECTRONIC DEVICE

TECHNICAL FIELD

The present disclosure relates to the field of communication technology, and particularly to a leaky-wave antenna, an antenna array, and an electronic device.

BACKGROUND

A leaky-wave antenna is a traveling-wave antenna, not only has the characteristic of a broadband, but also has the characteristic that a main lobe beam varies with frequency, thereby attracting wide attention. In a modern communication system, particularly for airborne communication and shipborne communication, a fixed-frequency scanning capability of an antenna is very important. While the leaky-wave antenna can only realize directional pattern scanning by changing the operating frequency, and cannot realize directional pattern scanning at a fixed frequency, so that the application range of the leaky-wave antenna is limited.

SUMMARY

The present disclosure is directed to at least one of the problems in the related art, and provides a leaky-wave antenna, an antenna array, and an electronic device.

In a first aspect, an embodiment of the present disclosure provides a leaky-wave antenna, including a first substrate and a second substrate opposite to each other; and an adjustable dielectric layer between the first substrate and the second substrate, where the first substrate includes a first dielectric substrate, and a first transmission line and a second transmission line on a side of the first dielectric substrate close to the adjustable dielectric layer; the first transmission line includes a first trunk line, at least one first main branch connected to the first trunk line on a side of an extending direction of the first trunk line, and at least one first auxiliary branch connected to the at least one first main branch, where a length of each of the at least one first auxiliary branch is less than a length of each of the at least one first main branch; the second transmission line includes a second trunk line, at least one second main branch connected to the second trunk line on a side of an extending direction of the second trunk line, and at least one second auxiliary branch connected to the at least one second main branch, where a length of each of the at least one second auxiliary branch is less than a length of each of the at least one second main branch; the first trunk line and the second trunk line are arranged side by side, and a first gap is between the first trunk line and the second trunk line; and the second substrate includes a second dielectric substrate and a reference electrode layer on a side of the second dielectric substrate close to the adjustable dielectric layer; and each of orthographic projections of the first transmission line and the second transmission line on the first dielectric substrate overlaps at least a part of an orthographic projection of the reference electrode layer on the first dielectric substrate.

The at least one first main branch and the at least one second main branch are in one-to-one correspondence; and for each of the at least one first main branch, a connection node between the first main branch and the first trunk line is a first node; and the first node is located on an extension line of the second main branch corresponding to the first main branch.

A connection node between each of the at least one first main branch and the first trunk line is a first node, an intersection between an extension line of each of the at least one second main branch and the first trunk line is a first intersection, and the first node and the first intersection are alternately arranged.

For each of the at least one first main branch and the first auxiliary branch connected to the first main branch, an included angle between the first main branch and the first trunk line is $\alpha 1$, and an included angle between the first auxiliary branch and the first main branch is $\beta 1$, and $\alpha 1+\beta 1$ is greater than −60 degrees and less than 60 degrees; and/or for each of the at least one second main branch and the second auxiliary branch connected to the second main branch, an included angle between the second main branch and the second trunk line is $\alpha 2$, an included angle between the second auxiliary branch and the second main branch is $\beta 2$, and $\alpha 2+\beta 2$ is greater than −60 degrees and less than 60 degrees.

Any one of the at least one first main branch includes a first side edge and a second side edge opposite to each other in the extending direction of the first trunk line, and each of the at least one first auxiliary branch is connected to the first side edge of the first main branch corresponding to the first auxiliary branch; and any one of the at least one second main branch includes a third side edge and a fourth side edge opposite to each other in the extending direction of the second trunk line, and each of the at least one second auxiliary branch is connected to the fourth side edge of the second main branch corresponding to the second auxiliary branch; and pointing directions of the second auxiliary branch and the first auxiliary branch are opposite to each other.

For each of the at least one first main branch and the first auxiliary branch connected to the first main branch, the first main branch and the first trunk line are perpendicular to each other, the first auxiliary branch is connected to an end of the first main branch away from the first trunk line, and the first main branch and the first auxiliary branch are perpendicular to each other.

A length of each of the at least one first auxiliary branch and a length of the first main branch corresponding to the first auxiliary branch are positively correlated.

The at least one first main branch includes a plurality of first main branches, at least two of the plurality of first main branches have unequal areas, and the larger an area of the first main branch is, the larger an area of the first auxiliary branch connected to the first main branch is; and/or the at least one second main branch includes a plurality of second main branches, at least two of the plurality of second main branches have unequal areas, and the larger an area of the second main branches is, the larger an area of the second auxiliary branch connected to the second main branch is.

The at least one first main branch includes a plurality of first main branches, at least two of the plurality of first main branches have unequal areas, and the larger an area of the first main branch is, the larger an area of the first auxiliary branch connected to the first main branch is, widths of all the first main branches are equal to each other, widths of all the first auxiliary branches are equal to each other, at least two of the plurality of first main branches have unequal lengths, and the longer the length of the first main branch is, the longer the length of the first auxiliary branch connected to the first main branch is; or lengths of all the first main branches are equal to each other, lengths of all the first auxiliary branches are equal to each other, at least two of the plurality of first main branches have unequal widths, and the wider the width of the first main branch is, the wider the width of the first auxiliary branch connected to the first main branch is.

The at least one second main branch includes a plurality of second main branches, at least two of the plurality of second main branches have unequal areas, and the larger an area of the second main branches is, the larger an area of the second auxiliary branch connected to the second main branch is, widths of all the second main branches are equal to each other, widths of all the second auxiliary branches are equal to each other, at least two of the plurality of second main branches have unequal lengths, and the longer the length of the second main branch is, the longer the length of the second auxiliary branch connected to the second main branch is; or lengths of all the second main branches are equal to each other, lengths of all the second auxiliary branches are equal to each other, at least two of the plurality of second main branches have unequal widths, and the wider the width of the second main branch is, the wider the width of the second auxiliary branch connected to the second main branch is.

The first main branch and the first auxiliary branch connected to the first main branch have equal thicknesses; at least two first main branches have unequal lengths, and the shorter the length of the first main branch is, the thinner the thickness of the first main branch is; and/or, the second main branch and the second auxiliary branch connected to the second main branch have equal thicknesses; at least two second main branches have unequal lengths, and the shorter the length of the second main branch is, the thinner the thickness of the second main branch is.

Any two first main branches adjacent to each other have a first distance therebetween, and any two second main branches adjacent to each other each have a first distance therebetween; values of at least two of the first distances are different from each other, and/or values of at least two of the second distances are different from each other.

The plurality of first main branches and the first auxiliary branches connected to the plurality of first main branches are divided into a plurality of first branch units;

a connection node between each of the plurality of first main branch and the first trunk line is a first node; a connection node between the first auxiliary branch and the first main branch is a second node;

for each of the plurality of first branch units, a first coordinate system is established, by taking a straight line, where a first trunk line is located, as a first horizontal axis, and taking a straight line perpendicular to the first trunk line as a first vertical axis; the first horizontal axis represents a distance $X_1$ from the first node to an origin of the first coordinate system, the first vertical axis represents a distance $Y_{i1}$ from an end of the first main branch away from the first node to the first horizontal axis, and $X_1$ is an elementary function of $Y_{i1}$; and the elementary function includes any one of a sine function, a cosine function, a logarithmic function, and an exponential function; and/or for each of the plurality of first branch units, a first coordinate system is established, by taking a straight line, where the first trunk line is located, as a first horizontal axis, and taking a straight line perpendicular to the first trunk line as a first vertical axis; the first horizontal axis represents a distance $X_2$ from the second node to the first vertical axis, the first vertical axis represents a distance $Y_{i2}$ from an end of the first auxiliary branch away from the second node to the first trunk line, and $X_2$ is an elementary function of $Y_{i2}$; and the elementary function includes any one of a sine function, a cosine function, a logarithmic function, and an exponential function.

The plurality of second main branches and the second auxiliary branches connected to the plurality of second main branches are divided into a plurality of second branch units;

a connection node between each of the plurality of second main branches and the second trunk line is a third node; a connection node between the second auxiliary branch and the second main branch is a fourth node;

for each of the plurality of second branch units, a second coordinate system is established by taking a straight line, where the second trunk line is located, as a second horizontal axis, and taking a straight line perpendicular to the second trunk line as a second vertical axis; the second horizontal axis represents a distance $X_3$ from the third node to an origin of the second coordinate system, the second vertical axis represents a distance $Y_{i3}$ from an end of the second main branch away from the third node to the second horizontal axis, and $X_3$ is an elementary function of $Y_{i3}$; and the elementary function includes any one of a sine function, a cosine function, a logarithmic function, and an exponential function; and/or for each of the plurality of second branch units, a second coordinate system is established, by taking a straight line, where the second trunk line is located, as a second horizontal axis, and taking a straight line perpendicular to the second trunk line as a second vertical axis; the second horizontal axis represents a distance $X_4$ from the fourth node to the second vertical axis, the second vertical axis represents a distance $Y_{i4}$ from an end of the second auxiliary branch away from the fourth node to the second trunk line, and $X_4$ is an elementary function of $Y_{i4}$; and the elementary function includes any one of a sine function, a cosine function, a logarithmic function, and an exponential function.

The reference electrode layer is provided with a hollow pattern, and each of orthographic projections of the first transmission line and the second transmission line on the first dielectric substrate does not overlap an orthographic projection of the hollow pattern on the first dielectric substrate.

In a second aspect, an embodiment of the present disclosure provides an antenna array, which includes a plurality of the leaky-wave antennas; where the plurality of leaky-wave antennas include any one of the leaky-wave antennas described above.

The antenna array further includes a feeding network configured to feed the plurality of leaky-wave antennas.

In a third aspect, an embodiment of the present disclosure provides an electronic device, which includes any one of the leaky-wave antennas described above, or any one of the antenna arrays described above.

DETAIL DESCRIPTION OF EMBODIMENTS

In order enable one of ordinary skill in the art to better understand the technical solutions of the present disclosure, the present disclosure is further described in detail with reference to the accompanying drawings and the detailed description below.

Unless defined otherwise, technical or scientific terms used herein shall have the ordinary meaning as understood by one of ordinary skill in the art to which the present disclosure belongs. The words "first", "second", and the like used in the present disclosure do not denote any order, quantity, or importance, but rather distinguish one element from another. Likewise, the word "a", "an", or "the" or the like does not denote a limitation of quantity, but rather denotes the presence of at least one. The word "comprising" or "comprises", or the like, means that an element or item preceding the word includes the element or item listed after the word and its equivalent, but does not exclude other elements or items. The word "connected" or "coupled" or the like is not restricted to physical or mechanical connections, but may include electrical connections, whether direct or indirect. "Upper", "lower", "left", "right", and the like are used only to indicate relative positional relationships, and when an absolute position of an object being described is changed, the relative positional relationships may also be changed accordingly.

Figure 1:
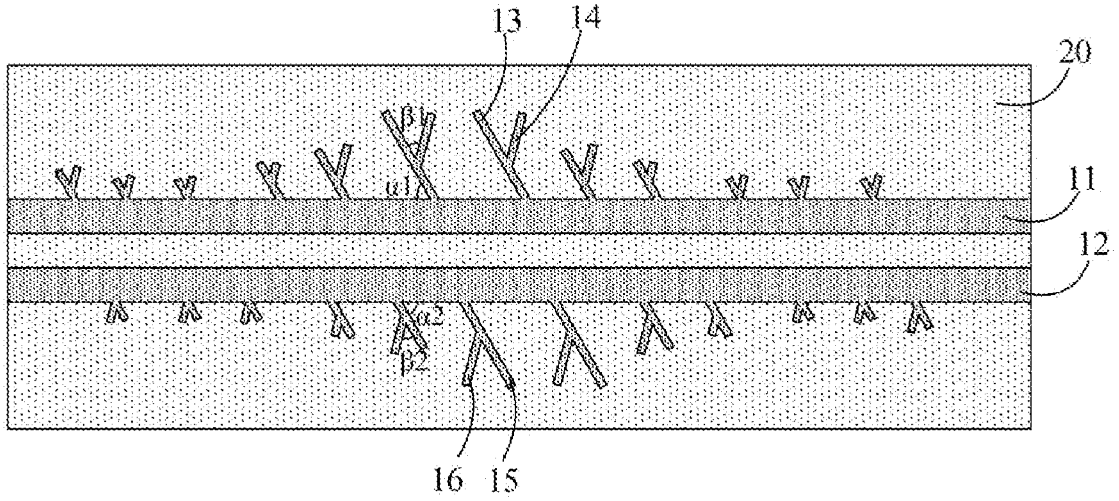
FIG. 1 is a top view of a leaky-wave antenna according to an embodiment of the present disclosure.
Figure 2:
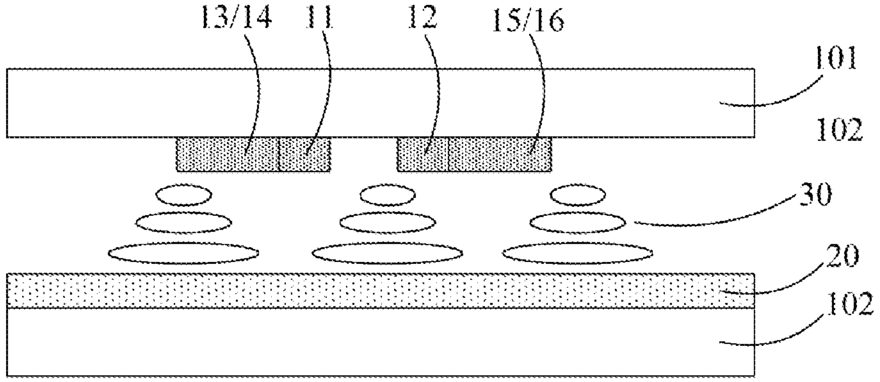
FIG. 2 is a cross-sectional view of a leaky-wave antenna according to an embodiment of the present disclosure.

FIG. 1 is a top view of a leaky-wave antenna according to an embodiment of the present disclosure; and FIG. 2 is a cross-sectional view of a leaky-wave antenna according to an embodiment of the present disclosure. In a first aspect, as shown in FIGS. 1 and 2, an embodiment of the present disclosure provides a leaky-wave antenna including a first substrate, a second substrate, and an adjustable dielectric layer arranged between the first substrate and the second substrate. The first substrate includes a first dielectric substrate 101, and a coupled microstrip line central strip (Metal-strip) arranged on a side of the first dielectric substrate 101 close to the adjustable dielectric layer. Specifically, the coupled microstrip line central strip includes a first transmission line and a second transmission line arranged side by side; the first transmission line includes a first trunk line 11, at least one first main branch 13 connected to the first trunk line 11 and a first auxiliary branch 14 connected to the first main branch 13; the second transmission line includes a second trunk line 12, at least one second main branch 15 connected to the second trunk line 12 and a second auxiliary branch 16 connected to the second main branch 15; the first main branch 13 and the second main branch 15 are arranged side by side, and a first gap is formed between the first main branch 13 and the second main branch 15. The second substrate includes a second dielectric substrate 102 and a reference electrode layer 20 arranged on the second dielectric substrate 102. Orthographic projections of the first transmission line and the second transmission line on the first dielectric substrate 101 each overlap at least a part of an orthographic projection of the reference electrode layer 20 on the first dielectric substrate 101.

It should be noted that, in the embodiment of the present disclosure, a length of each first main branch 13 is inevitably greater than a length of the first auxiliary branch 14 connected to the first main branch 13, and a connection node between the first auxiliary branch 14 and the first main branch 13 is spaced apart from the first trunk line 11 with a certain distance. Similarly, a length of each second main branch 15 is inevitably greater than a length of the second auxiliary branch 16 connected to the second main branch 15, and a connection node between the second auxiliary branch 16 and the second main branch 15 is spaced apart from the second trunk line 12 with a certain distance. The first trunk line 11 and the second trunk line 12 extend in a same or substantially the same direction (the term "substantially the same" means that an angle between two directions is not greater than 5°), and the first gap between the first trunk line 11 and the second trunk line 12 satisfies that microwave signals transmitted on the first trunk line 11 and the second trunk line 12 can be coupled. The reference electrode layer 20 includes, but is not limited to, a ground electrode layer, and the ground electrode is taken as an example of the reference electrode in the embodiment of the present disclosure. The adjustable dielectric layer includes, but is not limited to, a liquid crystal layer 30, and the liquid crystal layer 30 is taken as an example of the adjustable dielectric layer in the embodiment of the present disclosure.

In the embodiment of the present disclosure, when the leaky-wave antenna transmits a microwave signal, the first main branch 13 and the first auxiliary branch 14 connected to the first trunk line 11, and the second main branch 15 and the second auxiliary branch 16 connected to the second main branch 12, as transverse perturbation branches, perturb electromagnetic waves propagating on the first trunk line 11 and the second trunk line 12, respectively, thereby realizing microwave signal radiation. Meanwhile, since the liquid crystal molecules in the liquid crystal layer 30 are an electrically controllable material, when the first transmission line and the second transmission line are loaded with current, the long axis orientations of the liquid crystal molecules are directionally changed by an electric field formed between the first transmission line, the second transmission line and the ground electrode layer, thereby causing the dielectric constant ε of the liquid crystal layer 30 to be changed in an overlapping region between the first transmission line and the ground electrode layer and an overlapping region between the second transmission line and the ground electrode layer. Since a main beam angle of the leaky-wave antenna satisfies $\theta=\arccos(\beta/k_0)$, where $k_0$ is a wave number in free space and β is a phase shift constant of the liquid crystal fixed-frequency leaky-wave antenna, when the dielectric constant ε of the liquid crystal layer 30 changes, the phase shift constant β of the leaky-wave antenna will be directly changed, so that the main beam direction of the leaky-wave antenna changes, and the leaky-wave antenna has the fixed-frequency scanning characteristic.

In some examples, the first main branch 13, the first auxiliary branch 14, the second main branch 15, and the second auxiliary branch 16 may each have a rectangular shape, alternatively may each have a trapezoidal, triangular, or elliptical shape. In the embodiment of the present disclosure, only that the first main branch 13, the first auxiliary branch 14, the second main branch 15, and the second auxiliary branch 16 each have a rectangular shape, is taken as an example. In a case where the first main branch 13, the first auxiliary branch 14, the second main branch 15 and the second auxiliary branch 16 each have a rectangular shape, extending directions thereof are the length directions thereof, respectively.

In some examples, extending directions of the first main branches 13 of the first transmission line may be the same or substantially the same, that is, any two first main branches 13 are arranged in parallel, or an included angle between extension lines of any two first main branches 13 is not greater than 5°. Correspondingly, directions of the first auxiliary branches 14 may be the same or substantially the same, that is, any two of the first auxiliary branches 14 are arranged in parallel, or an included angle between extension lines of any two of the first auxiliary branches 14 is not greater than 5°. Similarly, extending directions of the second main branches 15 of the second transmission line may be the same or substantially the same, that is, any two second main branches 15 are arranged in parallel, or an included angle between extension lines of any two second main branches 15 is not greater than 5°. Correspondingly, directions of the second auxiliary branches 16 may be the same or substantially the same, that is, any two of the second auxiliary branches 16 are arranged in parallel, or an included angle between extension lines of any two second auxiliary branches 16 is not greater than 5°.

Furthermore, the extending directions of each first main branch 13 and each second main branch 15 are the same or substantially the same, that is, the first main branch 13 and the second main branch 15 are arranged in parallel, or an included angle between extension lines of any first main branch 13 and any second main branch 15 is not more than 5°.

In some examples, each first main branch 13 of the first transmission line has a first side edge and a second side edge opposite to each other along an extending direction of the first trunk line 11, and any first auxiliary branch 14 is connected to the first side edge of the first trunk line 11. That is, each of the first auxiliary branches 14 is connected to the corresponding first main branch 13 on a same side of the first main branch 13. Alternatively, a part of the first auxiliary branches 14 may each be connected to the first side edge of the corresponding first main branch 13, and the other part of the first auxiliary branches 14 may each be connected to the second side edge of the corresponding first main branch 13. Similarly, each second main branch 15 of the second transmission line has a third side edge and a fourth side edge opposite to each other along an extending direction of the second trunk line 12, any second auxiliary branch 16 is connected to the fourth side edge of the second trunk line 12, and pointing directions of the second auxiliary branch 16 and the first auxiliary branch 14 are opposite to each other (for example, in FIG. 1, the first auxiliary branch 14 points downward, and the second auxiliary branch 16 points upward). That is, each of the second auxiliary branches 16 is connected to the corresponding second main branch 15 on a same side of the second main branch 15. Alternatively, a part of the second auxiliary branches 16 may each be connected to the third side edge of the corresponding second main branch 15, and the other part of the second auxiliary branches 16 may each be connected to the fourth side edge of the corresponding second main branch 15.

Furthermore, the extending directions of each first auxiliary branch 14 and each second auxiliary branch 16 are the same or substantially the same, that is, the first auxiliary branch 14 and the second auxiliary branch 16 are arranged in parallel, or an included angle between extension lines of any first auxiliary branch 14 and any second auxiliary branch 16 is not greater than 5°.

In some examples, the first main branches 13 of the first transmission line and the second main branches 15 of the second transmission line are arranged in one-to-one correspondence. For the first main branch 13 and the second main branch 15 which are correspondingly arranged, a connection node between the first main branch 13 and the first trunk line 11 is a first node, and the first node is located on the extension line of the second main branch 15.

In some examples, a connection node between the first main branch 13 and the first trunk line 11 of the first transmission line is a first node, an intersection between an extension line of each second main branch 15 and the first trunk line 11 is a first intersection, and the first nodes and the first intersections are alternately arranged. That is, the first main branches 13 and the second main branches 15 are staggered.

In some examples, for any first main branch 13 and the first auxiliary branch 14 connected to the first main branch 13, an included angle between the first main branch 13 and the first trunk line 11 is $\alpha 1$, and an included angle between the first auxiliary branch 14 and the first main branch 13 is $\beta 1$, $\alpha 1+\beta 1$ is greater than −60 degrees and less than 60 degrees. Similarly, for any second main branch 15 and the second auxiliary branch 16 connected to the second main branch 15, an included angle between the second main branch 15 and the second trunk line 12 is $\alpha 2$, an included angle between the second auxiliary branch 16 and the second main branch 15 is $\beta 2$, and $\alpha 2+\beta 2$ is greater than −60 degrees and less than 60 degrees. The reason for this setting is that if the included angle is too large, it will result in an increase of a distance between the transverse branches and significantly enhance the dispersion effect, resulting in a reduction in radiation efficiency.

In some examples, for any first main branch 13 and the first auxiliary branch 14 connected to the first main branch 13, the first main branch 13 and the first trunk line 11 are arranged perpendicular to each other, and the first auxiliary branch 14 is connected to an end of the first main branch 13 away from the first main branch 13. For example, the first main branch 13 is connected to a midpoint of the first auxiliary branch 14, that is, the first main branch 13 and the first auxiliary branch 14 are connected into a T shape. Similarly, for any second main branch 15 and the second auxiliary branch 16 connected to the second main branch 15, the second main branch 15 and the second trunk line 12 are arranged perpendicular to each other, and the second auxiliary branch 16 is connected to an end of the second main branch 15 away from the second main branch 15. For example, the second main branch 15 is connected to a midpoint of the second auxiliary branch 16, that is, the second main branch 15 and the second auxiliary branch 16 are connected into a T shape.

In some examples, a length of the first main branch 13 and a length of the first auxiliary branch 14 are positively correlated, that is, for any two first main branches 13 with unequal lengths, a length of the first auxiliary branch 14 connected to one of the two first main branches 13 with a longer length, is greater than that of the first auxiliary branch 14 connected to the other one of the two first main branches. Similarly, a length of the second main branch 15 and a length of the second auxiliary branch 16 are positively correlated, that is, for any two second main branches 15 with unequal lengths, a length of the second auxiliary branch 16 connected to one of the two second main branches 15 with a longer length, is greater than that of the second auxiliary branch 16 connected to the other one of the two second main branches 15.

In some examples, the lengths of all the first main branches 13 may be equal to each other, and the lengths of all the first auxiliary branches 14 may also be equal to each other. Similarly, the lengths of all the second main branches 15 may be equal to each other, and the lengths of all the second auxiliary branches 16 may also be equal to each other. Furthermore, the lengths of all the first main branches 13 and all the second main branches 15 may be equal to each other, and the lengths of all the first auxiliary branches 14 and all the second auxiliary branches 16 may be equal to each other.

In some examples, areas of all the first main branches 13 may be equal to each other. Furthermore, in a case where the areas of all the first main branches 13 are equal to each other, the lengths of all the first main branches 13 are equal to each other, and widths of all the first main branches 13 are also equal to each other. Thus, the manufacturing of the first main branches 13 can be facilitated, and the change rule of the first main branches 13 is regular. Furthermore, in a case where the areas of all the first main branches 13 are equal to each other, areas of all the first auxiliary branches 14 connected to the first main branches are equal to each other. For example, the lengths of all the first auxiliary branches 14 are equal to each other, and widths of all the first auxiliary branches 14 are also equal to each other. Similarly, areas of all the second main branches 15 may be equal to each other. Furthermore, in a case where the areas of all the second main branches 15 are equal to each other, the lengths of all the second main branches 15 are equal to each other, and widths of all the second main branches 15 are also equal to each other. Thus, the manufacturing of the second main branches 15 can be facilitated, and the change rule of the second main branches 15 is regular. Furthermore, in a case where the areas of all the second main branches 15 are equal to each other, areas of all the second auxiliary branches 16 connected to the second main branches are equal to each other. For example, the lengths of all the second auxiliary branches 16 are equal to each other, and widths of the second auxiliary branches 16 are also equal to each other.

Furthermore, in a case where the areas of all the first main branches 13 are equal to each other, the areas of all the second main branches 15 are also equal to each other, and in this case, the areas of all the first main branches 13 and all the second main branches 15 may be designed to be equal to each other. Alternatively, the areas of all the first auxiliary branches 14 and all the second auxiliary branches 16 may be designed to be equal to each other. Thus, the manufacturing is facilitated.

In some examples, at least two of the plurality of first main branches 13 have unequal areas. Furthermore, in a case where at least two of the plurality of first main branches 13 have unequal areas, the first main branches 13 with unequal areas may have equal lengths and unequal widths, or have equal widths and unequal lengths, or have unequal lengths and unequal widths. In a case where two first main branches 13 have unequal areas, the first auxiliary branches 14 respectively connected to the two first main branches 13 also have unequal areas. In a case where the first main branches 13 with unequal areas have equal widths and unequal lengths, the first auxiliary branches 14 respectively connected to the first main branches 13 have equal widths and unequal lengths, and the first auxiliary branches 14 connected to the longer one of the first main branches 13 is also longer. In a case where the first main branches 13 with unequal areas have equal lengths, the first auxiliary branch 14 connected to the wider one of the first main branches 13 is also wider. Similarly, at least two of the plurality of second main branches 15 have unequal areas. Furthermore, in a case where at least two of the plurality of second main branches 15 have unequal areas, the second main branches 15 with unequal areas may have the equal lengths and unequal widths, or have equal widths and unequal lengths, or have unequal lengths and unequal widths. In a case two second main branches 15 have unequal areas, the areas of the second auxiliary branches 16 respectively connected to the two second main branches 15 also have unequal areas. Taking it as an example that the second main branches 15 with unequal areas have equal widths and unequal lengths, the second auxiliary branches 16 respectively connected to the second main branches 15 also have equal widths and unequal lengths, and the second auxiliary branch 16 connected to the longer one of the second main branches 15 is also longer. In a case where the second main branches 15 with unequal areas have equal lengths, the second auxiliary branch 16 connected to the wider one of the second main branches 15 is also wider.

In some examples, the first main branch 13 and the first auxiliary branch 14 connected to the first main branch 13 are of a one-piece structure, and have equal thicknesses. At least two first main branches 13 have unequal lengths, and the shorter the length of the first main branch 13 is, the thinner the thickness of the first main branch 13 is. The second main branch 15 and the second auxiliary branch 16 connected to the second main branch 15 are of a one-piece structure, and have equal thicknesses. At least two second main branches 15 have unequal lengths, and the shorter the length of the second main branch 15 is, the thinner the thickness of the second main branch 15 is. The reason for this setting is that, the transverse perturbation branch with the shorter length has a thinner thickness, so perturbation of the transverse perturbation branch with the shorter length on the electromagnetic wave in the medium is weaker; and the transverse perturbation branch with longer length has a relatively thicker thickness, so the perturbation of the transverse perturbation branch with longer length on the electromagnetic waves in the medium is stronger, and the energy reflection can be effectively reduced through the transverse perturbation branches with different thicknesses.

In some examples, any two first main branches 13 adjacent to each other have a first distance therebetween, and any two second main branches 15 adjacent to each other have a first distance therebetween; values of at least two of the first distances are different from each other, and/or values of at least two of the second distances are different from each other. Alternatively, the distance between any two first main branches 13 adjacent to each other may be equal, and the distance between any two second main branches 15 adjacent to each other may be equal.

In some examples, the first transmission line includes a plurality of first main branches 13, with a first auxiliary branch 14 connected to each of the plurality of first main branches 13. The plurality of first main branches 13 and the first auxiliary branches 14 connected to the plurality of first main branches are divided into a plurality of first branch units; a connection node between the first main branch 13 and the first trunk line 11 is a first node; a connection node between the first auxiliary branch 14 and the first main branch 13 is a second node. For each of the plurality of first branch units, a first coordinate system is established, by taking a straight line, where the first trunk line 11 is located, as a first horizontal axis, and taking a straight line perpendicular to the first trunk line 11 as a first vertical axis; the first horizontal axis represents a distance $X_1$ from the first node to an origin of the first coordinate system, the first vertical axis represents a distance $Y_{i1}$ from an end of the first main branch 13 away from the first node to the first horizontal axis, and $X_1$ is an elementary function of $Y_{i1}$; the elementary function includes any one of a sine function, a cosine function, a logarithmic function, and an exponential function. And/or, for each of the plurality of first branch units, a first coordinate system is established, by taking a straight line, where the first trunk line 11 is located, as a first horizontal axis, and taking a straight line perpendicular to the first trunk line 11 as a first vertical axis; the first horizontal axis represents a distance $X_2$ from the second node to the first vertical axis, the first vertical axis represents a distance $Y_{i2}$ from an end of the first auxiliary branch 14 away from the second node to the first trunk line 11, and $X_2$ is an elementary function of $Y_{i2}$; the elementary function includes any one of a sine function, a cosine function, a logarithmic function, and an exponential function.

In some examples, the second transmission line includes a plurality of second main branches 15, with a second auxiliary branch 16 connected to each of the plurality of second main branches 15. The plurality of second main branches 15 and the second auxiliary branches 16 connected to the plurality of second main branches are divided into a plurality of second branch units; a connection node between the second main branch 15 and the second trunk line 12 is a third node; a connection node between the second auxiliary branch 16 and the second main branch 15 is a fourth node; for each of the plurality of second branch units, a second coordinate system is established by taking a straight line, where the second trunk line 12 is located, as a second horizontal axis, and taking a straight line perpendicular to the second trunk line 12 as a second vertical axis; the second horizontal axis represents a distance $X_3$ from the third node to an origin of the second coordinate system, the second vertical axis represents a distance $Y_{i3}$ from an end of the second main branch 15 away from the third node to the second horizontal axis, and $X_3$ is an elementary function of $Y_{i3}$; the elementary function includes any one of a sine function, a cosine function, a logarithmic function, and an exponential function. And/or, for each of the plurality of second branch units, a second coordinate system is established, by taking a straight line, where the second trunk line 12 is located, as a second horizontal axis, and taking a straight line perpendicular to the second trunk line 12 as a second vertical axis; the second horizontal axis represents a distance $X_4$ from the fourth node to the second vertical axis, the second vertical axis represents a distance $Y_{i4}$ from an end of the second auxiliary branch 16 away from the fourth node to the second trunk line 12, and $X_4$ is an elementary function of $Y_{i4}$; the elementary function includes any one of a sine function, a cosine function, a logarithmic function, and an exponential function.

In some examples, the reference electrode layer 20 of the leaky-wave antenna is provided with a hollow pattern, and each of orthographic projections of the first transmission line and the second transmission line on the first dielectric substrate 101 does not overlap an orthographic projection of the hollow pattern on the first dielectric substrate 101. That is, the reference electrode layer 20 is hollowed out at a position where the reference electrode layer 20 overlaps the first transmission line and the second transmission line, thereby reducing the loss of conductive material with a certain value, and enhancing radiation. It should be noted that, since the reference electrode layer 20 is provided with the hollow pattern, a part of the inductive impedance is reduced, so that the frequency band of the antenna is changed, and in this case, the length of the periodic transverse perturbation branch is required to be redesigned, to realize directional scanning in the required frequency band.

In some examples, the first dielectric substrate 101 and the second dielectric substrate 102 may be made of a common PCB insulating board such as a Teflon glass fiber laminate, a phenol paper laminate, a phenol glass cloth laminate, or a hard material with low microwave loss such as quartz or glass.

In some examples, the materials of the first transmission line, the second transmission line, and the reference electrode layer 20 may be selected from low-resistance, low-loss metals such as copper, gold, silver, aluminum, and the like.

In some examples, the adjustable dielectric layer may employ not only the liquid crystal layer 30, but also other dielectric layers with electrically adjustable dielectric constant, such as a novel optical/temperature controlled dielectric layer. In the embodiment of the present disclosure, only the liquid crystal layer 30 is used as an example of the adjustable dielectric layer. Since the thickness of the liquid crystal layer 30 has a significant influence on the scanning and switching time of the beam, if the beam switching time is required to be controlled in a level of ms, the thickness of the liquid crystal layer 30 should not too large, and is preferably in a range from about 3 μm to about 50 μm. The liquid crystal layer 30 employed in the embodiment of the present disclosure has a thickness of 4.6 μm. The adjustable dielectric constants of different types of liquid crystals are different, and appropriate liquid crystals should be employed according to the required antenna beam scanning angle.

In order to make the structure of the leaky-wave antenna in the embodiments of the present disclosure more clear, the leaky-wave antenna in the embodiments of the present disclosure is specifically described below with reference to specific examples.

Figure 3:
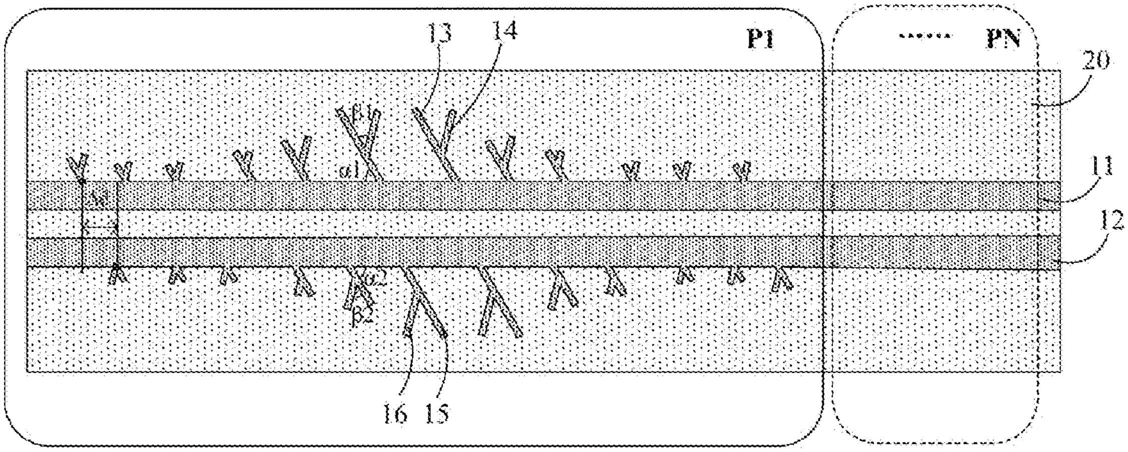
FIG. 3 is a top view of a leaky-wave antenna in a first example of an embodiment of the present disclosure.

A first example is as follows. FIG. 3 is a top view of a leaky-wave antenna in a first example of an embodiment of the present disclosure; as shown in FIG. 3, the leaky-wave antenna is divided into a plurality of antenna units (P1 to PN), and each antenna unit includes a first branch unit and a second branch unit arranged side by side. A connection node between the first main branch 13 and the first trunk line is a first node, and a connection node between the first auxiliary branch 14 and the first main branch 13 is a second node. A connection node of the second main branch 15 and the second trunk line 12 is a third node, and a connection node of the second auxiliary branch 16 and the second main branch 15 is a fourth node. For any antenna unit, the first main branches 13 and the second main branches 15 are arranged in one-to-one correspondence; with respect to the first main branch 13 and the second main branch 15 which are provided correspondingly, a straight line which is perpendicular to an extending direction of the first trunk line 11 and passes through the connection node between the first main branch 13 and the first trunk line 11 (the first node) is a first straight line, a straight line which is perpendicular to an extending direction of the second trunk line 12 and passes through the connection node between the second main branch 15 and the second trunk line 12 (the third node) is a second straight line, and a distance between the first straight line and the second straight line is Δd. A length of the first main branch 13 is $L_{n1}$, a length of the second main branch 15 is $L_{n2}$, a length of the first auxiliary branch 14 is $l_{n1}$, a length of the second auxiliary branch 16 is 42, a width of the first main branch 13 is $W_{n1}$, a width of the second main branch 15 is $W_{n2}$, a width of the first auxiliary branch 14 is $w_{n1}$, and a width of the second auxiliary branch 16 is $w_{n2}$. A distance between any two first main branches 13 adjacent to each other is a first distance $d_{n1}$, a distance between any two second main branches 15 adjacent to each other is a second distance $d_{n2}$, an included angle between the first main branch 13 and the first trunk line 11 is $\alpha_1$, an included angle between the first auxiliary branch 14 and the first main branch 13 is $\beta_1$, an included angle between the second main branch 15 and the second trunk line 12 is $\alpha_2$, and an included angle between the second auxiliary branch 16 and the second main branch 15 is $\beta_2$.

According to the surface plasmon theory, the electromagnetic oscillation excited on the medium interface and coupled with the fluctuation of the charge density has the characteristics of near field enhancement, surface limitation, short wavelength and the like, so if the length of the transverse branches and the distance between the branches are too large, a strong dispersion effect may be generated, and the radiation efficiency of the antenna is obviously lower. Combining the results of the HFSS simulation analysis: Ln1, Ln2, ln1, ln2 are all less than λ/5, preferably, Ln1=(1~10)×Wn1, Ln2=(1~10)×Wn2, that is, both of Ln1, Ln2 are around λ/(10-100), ln1=(1~5)×Wn1, ln2=(1~5)×Wn2, that is, both of Ln1, Ln2 are around λ/(20-100); $\alpha_1+\beta_1$ is greater than −60 degrees and less than 60 degrees, α2+β2 is greater than −60 degrees and less than 60 degrees, if the included angle is too large, it will result in an increase of a distance between the transverse branches and significantly enhance the dispersion effect, resulting in a reduction in radiation efficiency. The optimal structure of the perturbation branches on both sides of the coupled microstrip transmission line is a symmetrical structure, and if Δd is not equal to 0, the antenna can obtain the maximum radiation gain in a case where current flows through the perturbation branches on both sides in opposite directions, so when Δd is changed, the radiation and the gain of the liquid crystal antenna may be changed along with Δd. Due to the phase difference of 180 degrees between the coupled microstrip lines, when Δd=0 mm, the current cancellation effect between the perturbation branches is weakest, and in this case, the perturbation branch is of a symmetrical structure, and the antenna radiation gain is largest.

Figure 4:
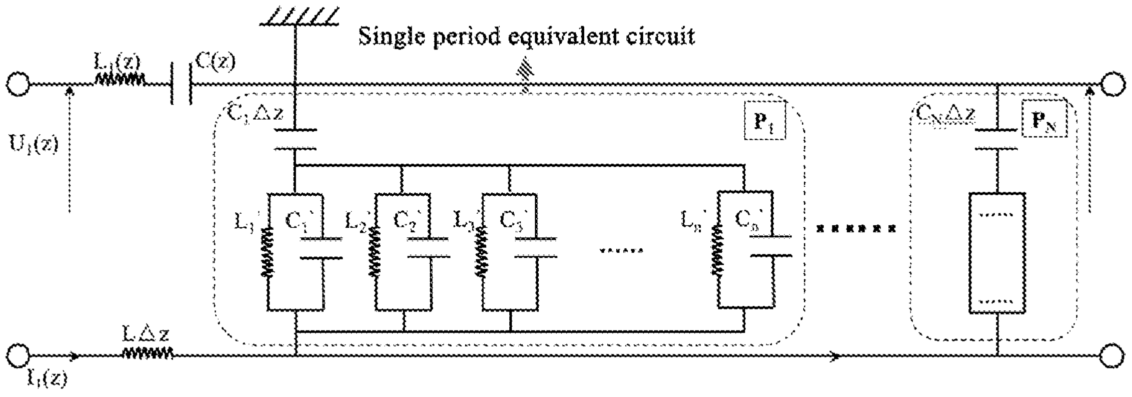
FIG. 4 is an equivalent circuit diagram of a leaky-wave antenna according to an embodiment of the present disclosure.

FIG. 4 is an equivalent circuit of a leaky-wave antenna, and as shown in FIG. 4, a circuit structure P1 of a single antenna unit period (single period) includes capacitors C1' to Cn', inductors L1' to Ln', and a capacitor C1, where the capacitors C1' to Cn' are formed by the first main branches 13, the first auxiliary branches 14, the second main branches 15 and a second auxiliary branch 16 with respect to the reference electrode layer 20; the inductors L1' to Ln' are formed by a combination of the first main branches 13, the first auxiliary branches 14, the second main branches 15 and the second auxiliary branches 16; the capacitor C1 is formed between the branches in the period and the reference electrode layer 20; and the capacitors C1' to Cn' and the inductors L1' to Ln' are connected in parallel, and then connected to the capacitor C1 in series. N branch periods (P1 to PN) are connected in parallel, and then are connected in series to a capacitor C (Z) and an inductor L(Z) of the coupled microstrip line itself, so that the coupled antenna equivalent circuit is formed.

Figure 5:
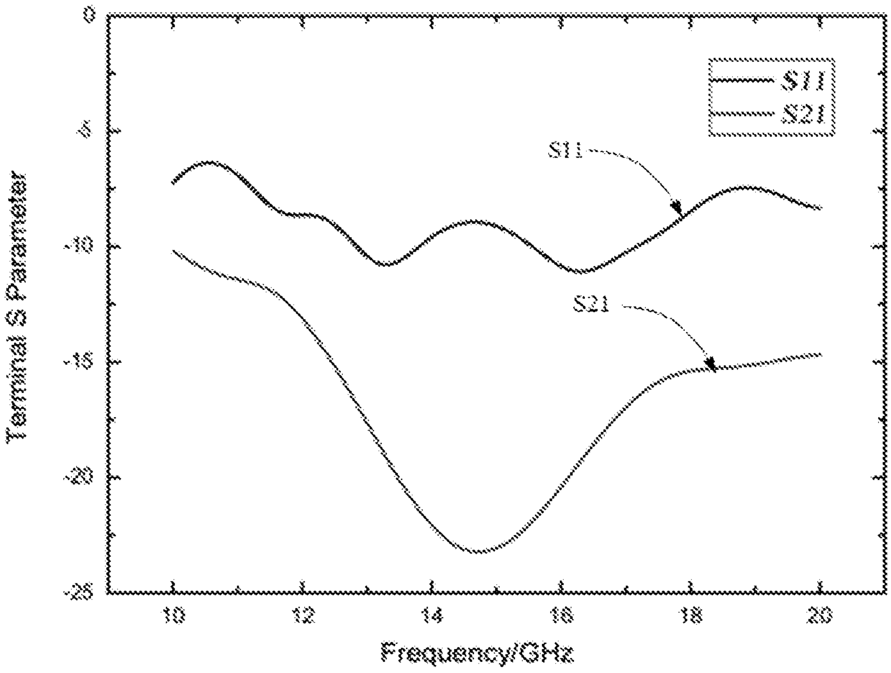
FIG. 5 is a graph illustrating simulation results of transmission coefficient S21 and reflection coefficient S11 of a leaky-wave antenna in a first example of an embodiment of the present disclosure.

In a case where Δd=0 mm, FIG. 5 is a graph illustrating simulation results of transmission coefficient S21 and reflection coefficient S11 of the leaky-wave antenna in the first example of the embodiment of the present disclosure. As shown in FIG. 5, in the operating frequency band of 12 GHz to 20 GHz, the transmission coefficient S21<−15 dB, and the reflection coefficient S11<−10 dB, the liquid crystal antenna has good radiation effect in the operating frequency band.

Figure 6:
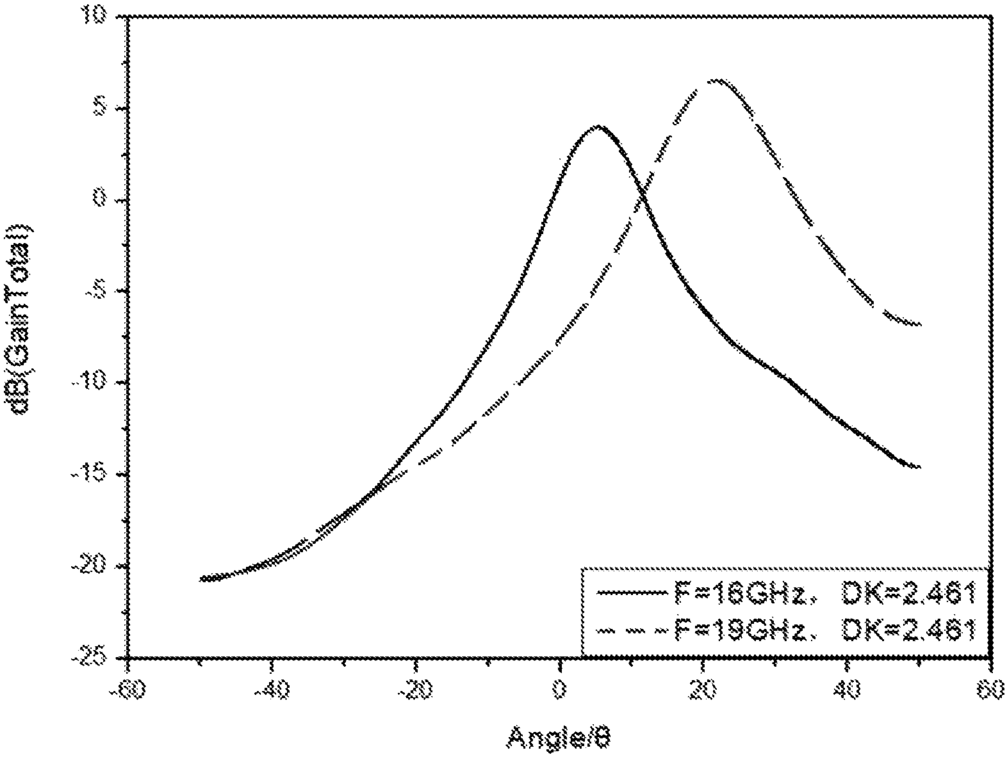
FIG. 6 is a graph illustrating variation of main beam angle θ of a leaky-wave antenna in a first example of an embodiment of the present disclosure with operating frequency F.

The main beam angle of the leaky wave antenna may vary with operating frequency. FIG. 6 is a graph illustrating variation of main beam angle θ of the leaky-wave antenna in the first example of the embodiment of the present disclosure with the operating frequency F. As shown in FIG. 6, it can be seen that the main beam angle of the antenna is deflected from θ=0° at f=16 GHz to θ=25° at f=19 GHz.

Figure 7:
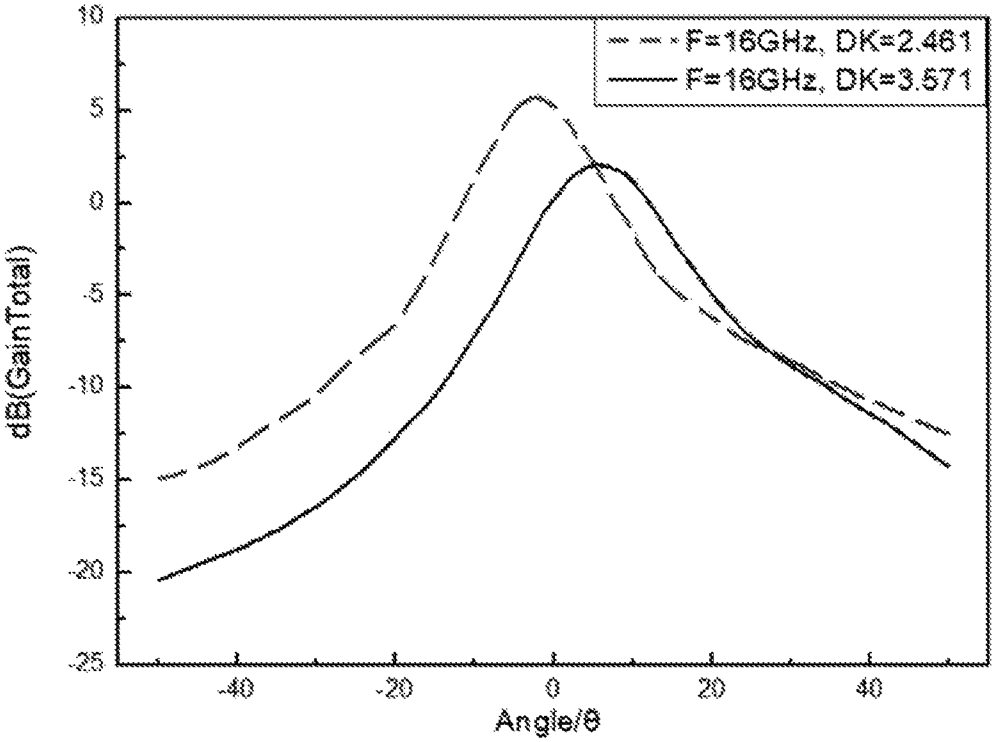
FIG. 7 is a graph illustrating variation of main beam angle θ of a leaky-wave antenna in a first example of an embodiment of the present disclosure with dielectric constant ε of a liquid crystal layer.

The main beam angle θ of the leaky-wave antenna may also vary with dielectric constant ε of an intermediate dielectric layer. FIG. 7 is a graph illustrating variation of the main beam angle θ of the leaky-wave antenna in the first example of the embodiment of the present disclosure with the dielectric constant ε of the liquid crystal layer 30. As shown in FIG. 7, when the dielectric constant ε of the liquid crystal of the middle dielectric layer of the leaky-wave antenna changes (from 2.471 to 3.571) at the operating frequency f=16 GHz, the main beam direction of the leaky-wave antenna changes from θ=−10° to θ=10° with the change of the dielectric constant of the liquid crystal.

Figure 8:
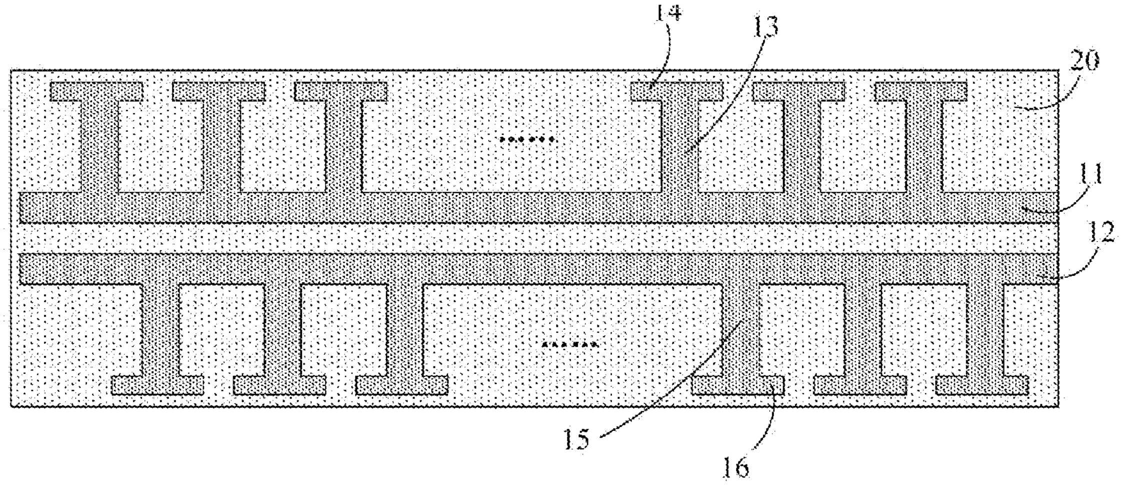
FIG. 8 is a top view of a leaky-wave antenna in a second example of an embodiment of the present disclosure.
Figure 9:
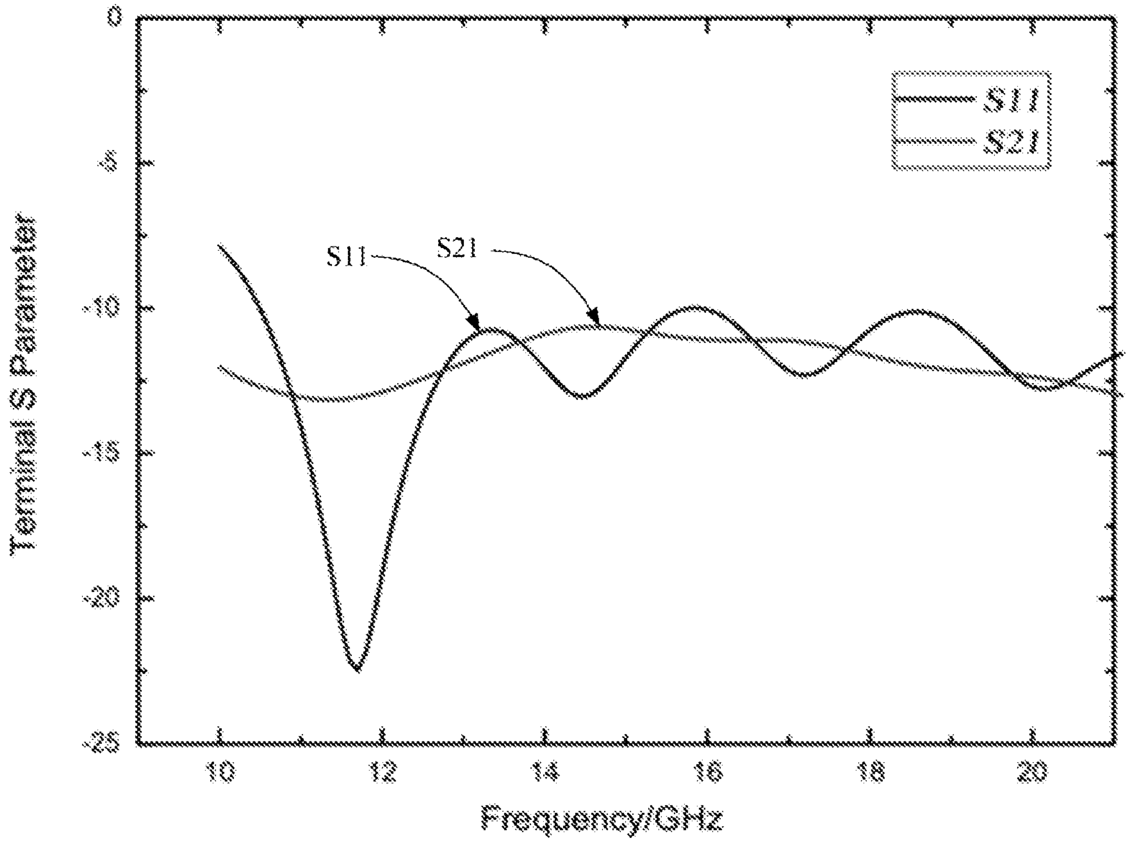
FIG. 9 is a graph illustrating simulation results of transmission coefficient S21 and reflection coefficient S11 of a leaky-wave antenna in a second example of an embodiment of the present disclosure.
Figure 12:
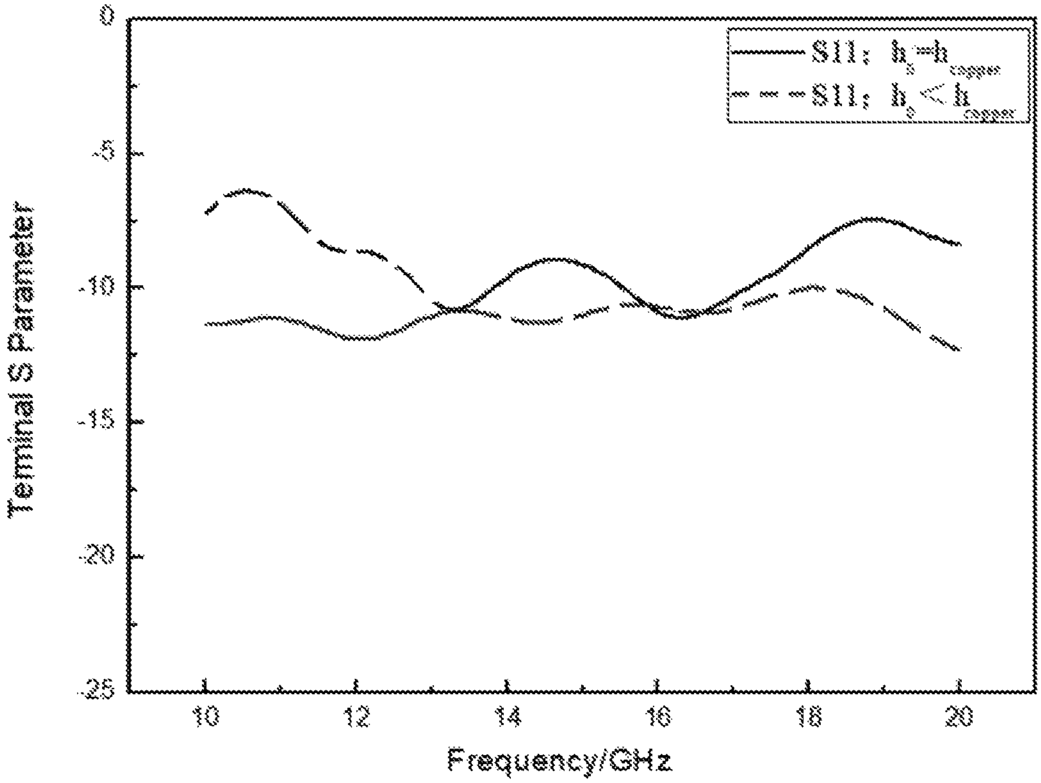
FIG. 12 is a graph illustrating simulation results of reflection coefficients S11 of leaky-wave antennas having perturbation branches with different thicknesses and the same thickness, respectively, in a third example of an embodiment of the present disclosure.

A second example is as follows. FIG. 8 is a top view of a leaky-wave antenna in a second example of the embodiment of the present disclosure. As shown in FIG. 8, this example is substantially the same as the first example, except that the first auxiliary branch 14 is connected to an end of the corresponding first main branch 13 away from the first trunk line 11, to form a T-branch; and the second auxiliary branch 16 is connected to an end of the corresponding second main branch 15 away from the second trunk line 12, to form a T-branch. As shown in FIG. 12, in this case, the leaky-wave antenna gain is significantly increased at 12 GHz, compared with the first example. Therefore, the T-branch coupled antenna is suitable for some use scenes requiring high gain. Similarly to the first example, the line width of the first trunk line 11 is $W_1$, the line width of the second trunk line 12 is $W_2$, the distance between the first trunk line 11 and the second trunk line 12 is S, the thickness of the liquid crystal layer 30 is h, all of $W_1$, $W_2$, and S are less than λ/100 (assuming the wavelength of the antenna corresponding to the highest operating frequency f is λ), h=1~100 μm, and preferably in a range from 3 μm to 50 μm.

Figure 10:
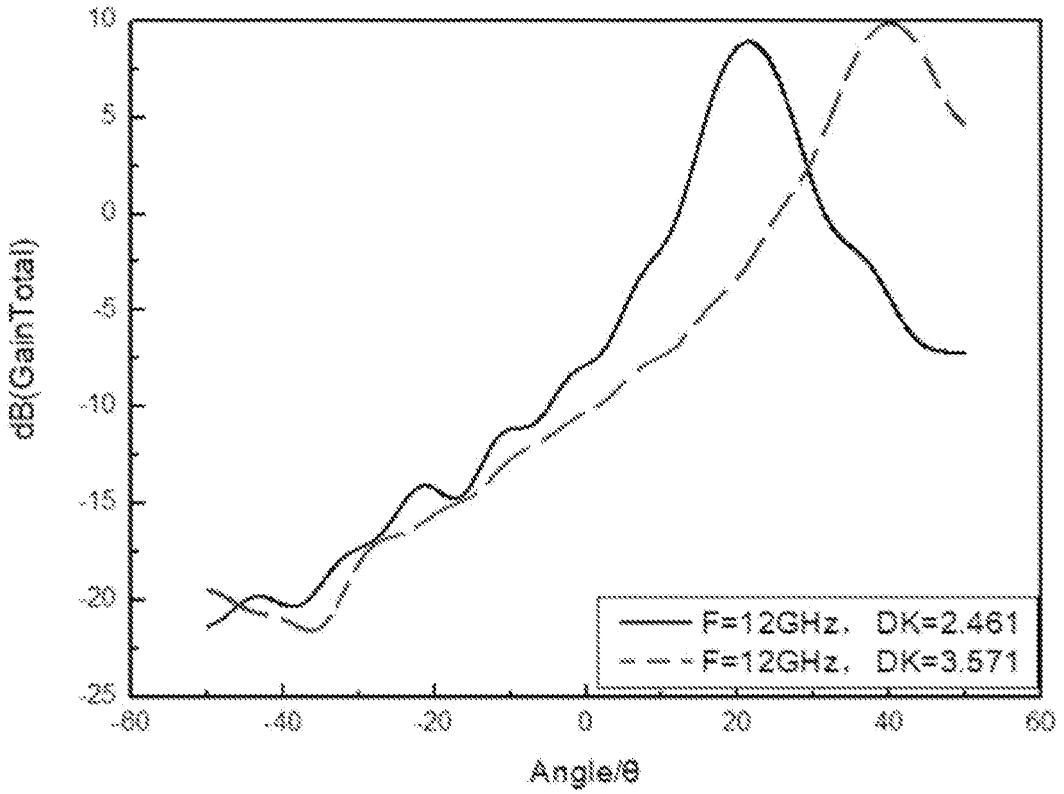
FIG. 10 is a graph illustrating variation of main beam angle θ of a leaky-wave antenna in a second example of an embodiment of the present disclosure with operating frequency F.

FIG. 10 is a graph illustrating variation of main beam angle θ of a leaky-wave antenna in a second example of an embodiment of the present disclosure with operating frequency F. As shown in FIG. 10, since the first main branch 13 is completely perpendicular to the first auxiliary branch 14, and the second main branch 15 is completely perpendicular to the second auxiliary branch 16, the capacitance effect generated between the main branch and the auxiliary branch can be reduced, so that the change of the main beam angle of the leaky-wave antenna due to the frequency sweeping effect along with the change of the dielectric constant ε of the liquid crystal is reduced, and thus the effect of the leaky-wave antenna in this example is better.

A third example is as follows. This example is substantially the same in structure as the first example, except that at least two of the second main branches 15 have unequal lengths, and the shorter the length of the second main branch 15 is, the thinner the thickness of the second main branch 15 is. The reason for this setting is that, the transverse perturbation branch with the shorter length has a thinner thickness, so perturbation of the transverse perturbation branch with the shorter length on the electromagnetic wave in the medium is weaker; and the transverse perturbation branch with longer length has a relatively thicker thickness, so the perturbation of the transverse perturbation branch with longer length on the electromagnetic waves in the medium is stronger, and the energy reflection can be effectively reduced through the transverse perturbation branches with different thicknesses.

Figure 11:
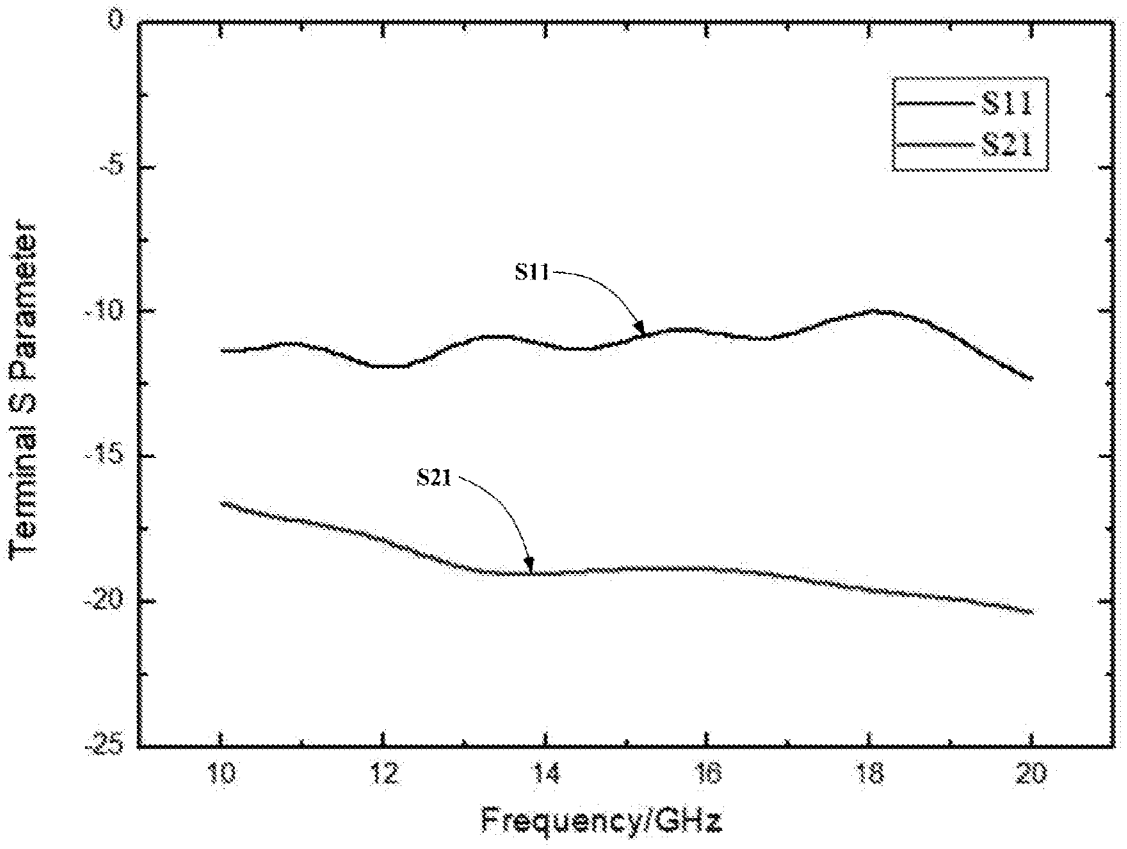
FIG. 11 is a graph illustrating simulation results of transmission coefficients S21 and reflection coefficients S11 of a leaky-wave antenna in a third example of an embodiment of the present disclosure.

Referring to FIG. 3, the first three first main branches 13, the first three second main branches 15, the last three first main branches 13, and the last three second main branches 15 in the antenna unit are shorter in length, thereby are thinner than the first main branches 13 and the second main branches 15 with relatively longer length in the antenna unit, and have weak perturbation on electromagnetic waves in the medium; and the transverse perturbation branch with longer length has a relatively thicker thickness, so the perturbation of the transverse perturbation branch with longer length on the electromagnetic waves in the medium is stronger. The reflection and transmission coefficients of the leaky-wave antenna having the perturbation branches with different thicknesses are shown in FIG. 11. This design can significantly reduce S11 compared with the perturbation branch model with the same thickness, as shown in FIG. 12, thereby reducing the energy reflection of the antenna.

Figure 13:
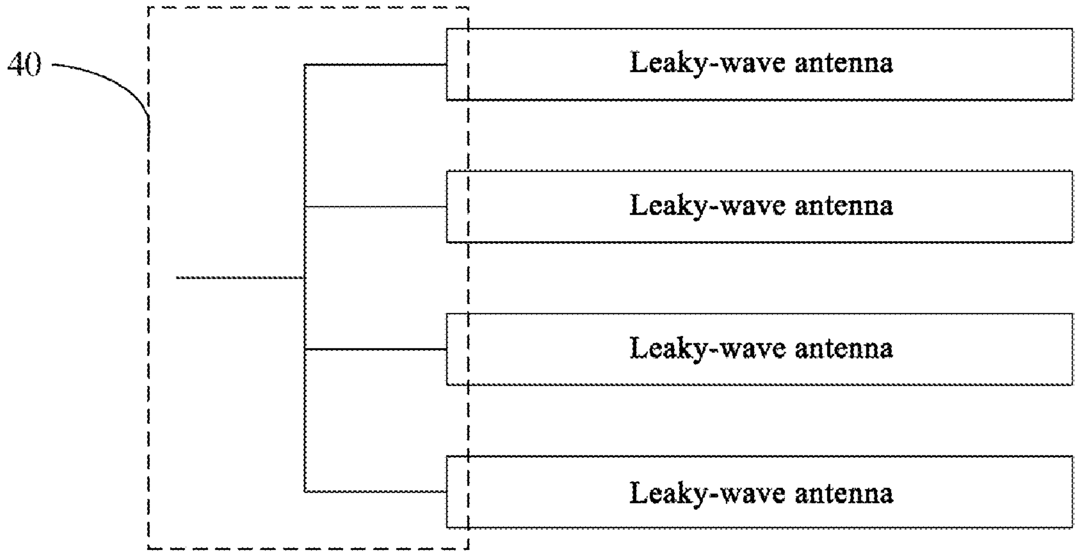
FIG. 13 is a schematic diagram of an antenna array according to an embodiment of the present disclosure.

FIG. 13 is a schematic diagram of an antenna array according to an embodiment of the present disclosure. In a second aspect, as shown in FIG. 13, an embodiment of the present disclosure further provides an antenna array, which includes a plurality of leaky-wave antennas. The leaky-wave antenna may employ any one of the leaky-wave antennas described above. Furthermore, in the embodiment of the present disclosure, the antenna array further includes a feeding network 40 configured to feed the plurality of leaky-wave antennas.

The antenna array according to the embodiment of the present disclosure may be applied to airborne communication, ground long-distance communication, shipborne communication, or the like. The antenna array according to the embodiment of the present disclosure may alternatively adopt an end-fire array according to a use scene, and the end-fire array may realize a bidirectional radiation pattern. Compared with a linear array, the end-fire array has the advantages of narrower beam width, lower gain and higher directivity. The radiation direction of the end-fire array is parallel to the array plane and perpendicular to a vibrator, and radiation direction of the vibrator is toward the end of the array, namely, the radiation direction of the array is consistent with the radiation direction of the vibrator.

In a third aspect, an embodiment of the present disclosure provides an electronic device, which may include any one leaky-wave antenna described above, and alternatively may include the antenna array described above.

The electronic device according to an embodiment of the present disclosure further includes a transceiving unit, a radio frequency transceiver, a signal amplifier, a power amplifier, and a filtering unit. An antenna in a communication device may be used as a transmitting antenna or as a receiving antenna. The transceiving unit may include a baseband and a receiving terminal, where the baseband provides a signal of at least one frequency band, for example, provides a 2G signal, a 3G signal, a 4G signal, a 5G signal, or the like, and transmits the signal of at least one frequency band to the radio frequency transceiver. After receiving a signal, the antenna in the communication system may transmit the signal to a receiving terminal in the transceiving unit after the signal is processed by the filtering unit, the power amplifier, the signal amplifier, and the radio frequency transceiver, where the receiving terminal may be, for example, an intelligent gateway.

Furthermore, the radio frequency transceiver is connected to the transceiving unit and is used for modulating the signals transmitted by the transceiving unit or for demodulating the signals received by the antenna and then transmitting the signals to the transceiving unit. Specifically, the radio frequency transceiver may include a transmitting circuit, a receiving circuit, a modulating circuit, and a demodulating circuit. After the transmitting circuit receives various types of signals provided by the baseband, the modulating circuit may modulate the various types of signals provided by the baseband, and then transmit the modulated signals to the antenna. The antenna receives the signal and transmits the signal to the receiving circuit of the radio frequency transceiver, the receiving circuit transmits the signal to the demodulating circuit, and the demodulating circuit demodulates the signal and transmits the demodulated signal to the receiving terminal.

Furthermore, the radio frequency transceiver is connected to the signal amplifier and the power amplifier, the signal amplifier and the power amplifier are further connected to the filtering unit, and the filtering unit is connected to at least one antenna. In the process of transmitting a signal by the communication system, the signal amplifier is used for improving a signal-to-noise ratio of the signal output by the radio frequency transceiver and then transmitting the signal to the filtering unit; the power amplifier is used for amplifying a power of the signal output by the radio frequency transceiver and then transmitting the signal to the filtering unit; the filtering unit specifically includes a duplexer and a filtering circuit, the filtering unit combines signals output by the signal amplifier and the power amplifier into a signal and filters out noise waves and then transmits the signal to the antenna, and the antenna radiates the signal. In the process of receiving a signal by the antenna system, the antenna receives the a signal and then transmits the signal to the filtering unit, the filtering unit filters out noise waves in the signal received by the antenna and then transmits the signal to the signal amplifier and the power amplifier, and the signal amplifier gains the signal received by the antenna and increases the signal-to-noise ratio of the signal; the power amplifier amplifies a power of the signal received by the antenna. The signal received by the antenna is processed by the power amplifier and the signal amplifier and then transmitted to the radio frequency transceiver, and the radio frequency transceiver transmits the signal to the transceiving unit.

In some examples, the signal amplifier may include various types of signal amplifiers, such as a low noise amplifier, which is not limited herein.

In some examples, the electronic device according to an embodiment of the present disclosure further includes a power management unit, connected to the power amplifier, for providing the power amplifier with a voltage for amplifying the signal.

It will be understood that the above embodiments are merely exemplary embodiments adopted to illustrate the principles of the present disclosure, and the present disclosure is not limited thereto. It will be apparent to one of ordinary skill in the art that various changes and modifications can be made without departing from the spirit and essence of the present disclosure, and these changes and modifications are to be considered within the scope of the present disclosure.

What is claimed is:

1. A leaky-wave antenna, comprising: a first substrate and a second substrate opposite to each other; and an adjustable dielectric layer between the first substrate and the second substrate, wherein the first substrate comprises a first dielectric substrate, and a first transmission line and a second transmission line on a side of the first dielectric substrate close to the adjustable dielectric layer; the first transmission line comprises a first trunk line, at least one first main branch connected to the first trunk line on a side of an extending direction of the first trunk line, and at least one first auxiliary branch connected to the at least one first main branch, wherein a length of each of the at least one first auxiliary branch is less than a length of each of the at least one first main branch; the second transmission line comprises a second trunk line, at least one second main branch connected to the second trunk line on a side of an extending direction of the second trunk line, and at least one second auxiliary branch connected to the at least one second main branch, wherein a length of each of the at least one second auxiliary branch is less than a length of each of the at least one second main branch; the first trunk line and the second trunk line are arranged side by side, and a first gap is between the first trunk line and the second trunk line; and the second substrate comprises a second dielectric substrate and a reference electrode layer on a side of the second dielectric substrate close to the adjustable dielectric layer; and each of orthographic projections of the first transmission line and the second transmission line on the first dielectric substrate overlaps at least a part of an orthographic projection of the reference electrode layer on the first dielectric substrate.

2. The leaky-wave antenna according to claim 1, wherein the at least one first main branch and the at least one second main branch are in one-to-one correspondence; and for each of the at least one first main branch, a connection node between the first main branch and the first trunk line is a first node; and the first node is located on an extension line of the second main branch corresponding to the first main branch.

3. The leaky-wave antenna according to claim 1, wherein a connection node between each of the at least one first main branch and the first trunk line is a first node, an intersection between an extension line of each of the at least one second main branch and the first trunk line is a first intersection, and the first node and the first intersection are alternately arranged.

4. The leaky-wave antenna according to claim 1, wherein, for each of the at least one first main branch and the first auxiliary branch connected to the first main branch, an included angle between the first main branch and the first trunk line is $\alpha 1$, and an included angle between the first auxiliary branch and the first main branch is $\beta 1$, and $\alpha 1+\beta 1$ is greater than-60 degrees and less than 60 degrees; and/or for each of the at least one second main branch and the second auxiliary branch connected to the second main branch, an included angle between the second main branch and the second trunk line is $\alpha 2$, an included angle between the second auxiliary branch and the second main branch is $\beta 2$, and $\alpha 2+\beta 2$ is greater than-60 degrees and less than 60 degrees.

5. The leaky-wave antenna according to claim 1, wherein any one of the at least one first main branch comprises a first side edge and a second side edge opposite to each other in the extending direction of the first trunk line, and each of the at least one first auxiliary branch is connected to the first side edge of the first main branch corresponding to the first auxiliary branch; and any one of the at least one second main branch comprises a third side edge and a fourth side edge opposite to each other in the extending direction of the second trunk line, and each of the at least one second auxiliary branch is connected to the fourth side edge of the second main branch corresponding to the second auxiliary branch; and pointing directions of the second auxiliary branch and the first auxiliary branch are opposite to each other.

6. The leaky-wave antenna according to claim 1, wherein for each of the at least one first main branch and the first auxiliary branch connected to the first main branch, the first main branch and the first trunk line are perpendicular to each other, the first auxiliary branch is connected to an end of the first main branch away from the first trunk line, and the first main branch and the first auxiliary branch are perpendicular to each other.

7. The leaky-wave antenna according to claim 1, wherein a length of each of the at least one first auxiliary branch and a length of the first main branch corresponding to the first auxiliary branch are positively correlated.

8. The leaky-wave antenna according to claim 1, wherein the at least one first main branch comprises a plurality of first main branches, at least two of the plurality of first main branches have unequal areas, and the larger an area of the first main branch is, the larger an area of the first auxiliary branch connected to the first main branch is; and/or the at least one second main branch comprises a plurality of second main branches, at least two of the plurality of second main branches have unequal areas, and the larger an area of the second main branches is, the larger an area of the second auxiliary branch connected to the second main branch is.

9. The leaky-wave antenna according to claim 8, wherein the at least one first main branch comprises a plurality of first main branches, at least two of the plurality of first main branches have unequal areas, and the larger an area of the first main branch is, the larger an area of the first auxiliary branch connected to the first main branch is, widths of all the first main branches are equal to each other, widths of all the first auxiliary branches are equal to each other, at least two of the plurality of first main branches have unequal lengths, and the longer the length of the first main branch is, the longer the length of the first auxiliary branch connected to the first main branch is; or lengths of all the first main branches are equal to each other, lengths of all the first auxiliary branches are equal to each other, at least two of the plurality of first main branches have unequal widths, and the wider the width of the first main branch is, the wider the width of the first auxiliary branch connected to the first main branch is.

10. The leaky-wave antenna according to claim 8, wherein the at least one second main branch comprises a plurality of second main branches, at least two of the plurality of second main branches have unequal areas, and the larger an area of the second main branches is, the larger an area of the second auxiliary branch connected to the second main branch is, widths of all the second main branches are equal to each other, widths of all the second auxiliary branches are equal to each other, at least two of the plurality of second main branches have unequal lengths, and the longer the length of the second main branch is, the longer the length of the second auxiliary branch connected to the second main branch is; or lengths of all the second main branches are equal to each other, lengths of all the second auxiliary branches are equal to each other, at least two of the plurality of second main branches have unequal widths, and the wider the width of the second main branch is, the wider the width of the second auxiliary branch connected to the second main branch is.

11. The leaky-wave antenna according to claim 8, wherein the first main branch and the first auxiliary branch connected to the first main branch have equal thicknesses; at least two first main branches have unequal lengths, and the shorter the length of the first main branch is, the thinner the thickness of the first main branch is; and/or, the second main branch and the second auxiliary branch connected to the second main branch have equal thicknesses; at least two second main branches have unequal lengths, and the shorter the length of the second main branch is, the thinner the thickness of the second main branch is.

12. The leaky-wave antenna according to claim 8, wherein any two first main branches adjacent to each other have a first distance therebetween, and any two second main branches adjacent to each other each have a first distance therebetween; values of at least two of the first distances are different from each other, and/or values of at least two of the second distances are different from each other.

13. The leaky-wave antenna according to claim 8, wherein the plurality of first main branches and the first auxiliary branches connected to the plurality of first main branches are divided into a plurality of first branch units;

a connection node between each of the plurality of first main branch and the first trunk line is a first node; a connection node between the first auxiliary branch and the first main branch is a second node;

for each of the plurality of first branch units, a first coordinate system is established, by taking a straight line, where a first trunk line is located, as a first horizontal axis, and taking a straight line perpendicular to the first trunk line as a first vertical axis; the first horizontal axis represents a distance $X_1$ from the first node to an origin of the first coordinate system, the first vertical axis represents a distance $Y_{i1}$ from an end of the first main branch away from the first node to the first horizontal axis, and $X_1$ is an elementary function of $Y_{i1}$; and the elementary function comprises any one of a sine function, a cosine function, a logarithmic function, and an exponential function; and/or for each of the plurality of first branch units, a first coordinate system is established, by taking a straight line, where the first trunk line is located, as a first horizontal axis, and taking a straight line perpendicular to the first trunk line as a first vertical axis; the first horizontal axis represents a distance $X_2$ from the second node to the first vertical axis, the first vertical axis represents a distance $Y_{i2}$ from an end of the first auxiliary branch away from the second node to the first trunk line, and $X_2$ is an elementary function of $Y_{i2}$; and the elementary function comprises any one of a sine function, a cosine function, a logarithmic function, and an exponential function.

14. The leaky-wave antenna according to claim 8, wherein the plurality of second main branches and the second auxiliary branches connected to the plurality of second main branches are divided into a plurality of second branch units;

a connection node between each of the plurality of second main branches and the second trunk line is a third node; a connection node between the second auxiliary branch and the second main branch is a fourth node;

for each of the plurality of second branch units, a second coordinate system is established by taking a straight line, where the second trunk line is located, as a second horizontal axis, and taking a straight line perpendicular to the second trunk line as a second vertical axis; the second horizontal axis represents a distance $X_3$ from the third node to an origin of the second coordinate system, the second vertical axis represents a distance $Y_{i3}$ from an end of the second main branch away from the third node to the second horizontal axis, and $X_3$ is an elementary function of $Y_{i3}$; and the elementary function comprises any one of a sine function, a cosine function, a logarithmic function, and an exponential function; and/or for each of the plurality of second branch units, a second coordinate system is established, by taking a straight line, where the second trunk line is located, as a second horizontal axis, and taking a straight line perpendicular to the second trunk line as a second vertical axis; the second horizontal axis represents a distance $X_4$ from the fourth node to the second vertical axis, the second vertical axis represents a distance $Y_{i4}$ from an end of the second auxiliary branch away from the fourth node to the second trunk line, and $X_4$ is an elementary function of $Y_{i4}$; and the elementary function comprises any one of a sine function, a cosine function, a logarithmic function, and an exponential function.

15. The leaky-wave antenna according to claim 1, wherein the reference electrode layer is provided with a hollow pattern, and each of orthographic projections of the first transmission line and the second transmission line on the first dielectric substrate does not overlap an orthographic projection of the hollow pattern on the first dielectric substrate.

16. An antenna array, comprising a plurality of leaky-wave antennas; wherein the plurality of leaky-wave antennas comprise the leaky-wave antenna according to claim 1.

17. The antenna array according to claim 16, further comprising a feeding network configured to feed the plurality of leaky-wave antenna.

18. An electronic device, comprising the leaky-wave antenna according to claim 1.

19. An electronic device, comprising the antenna array according claim 16.

20. An electronic device, comprising the antenna array according claim 17.

* * * * *